June 18, 1940.  R. A. AVERY  2,204,720
BRAKE APPARATUS
Filed March 23, 1939   2 Sheets-Sheet 2
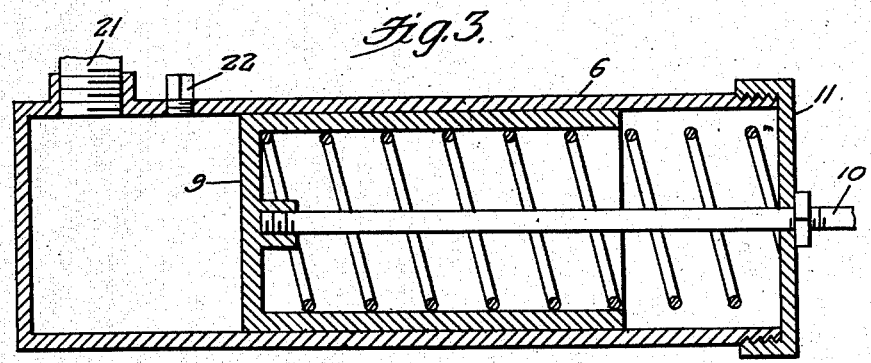
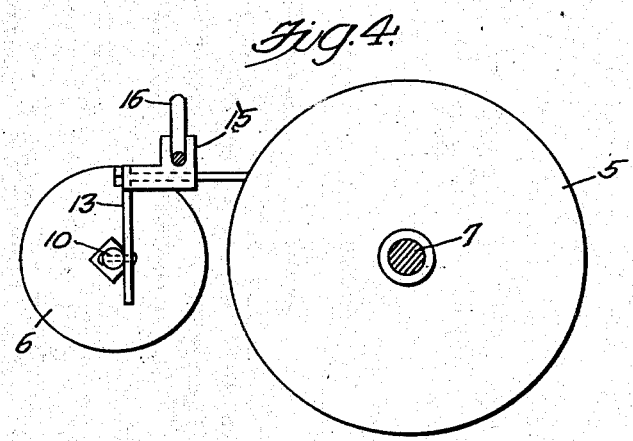
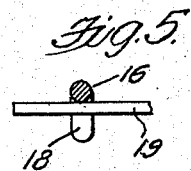
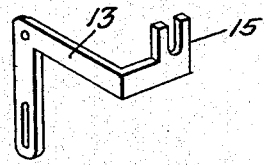
Inventor
Rube A. Avery.
By Clarence A. O'Brien
and Hyman Berman
Attorneys Patented June 18, 1940

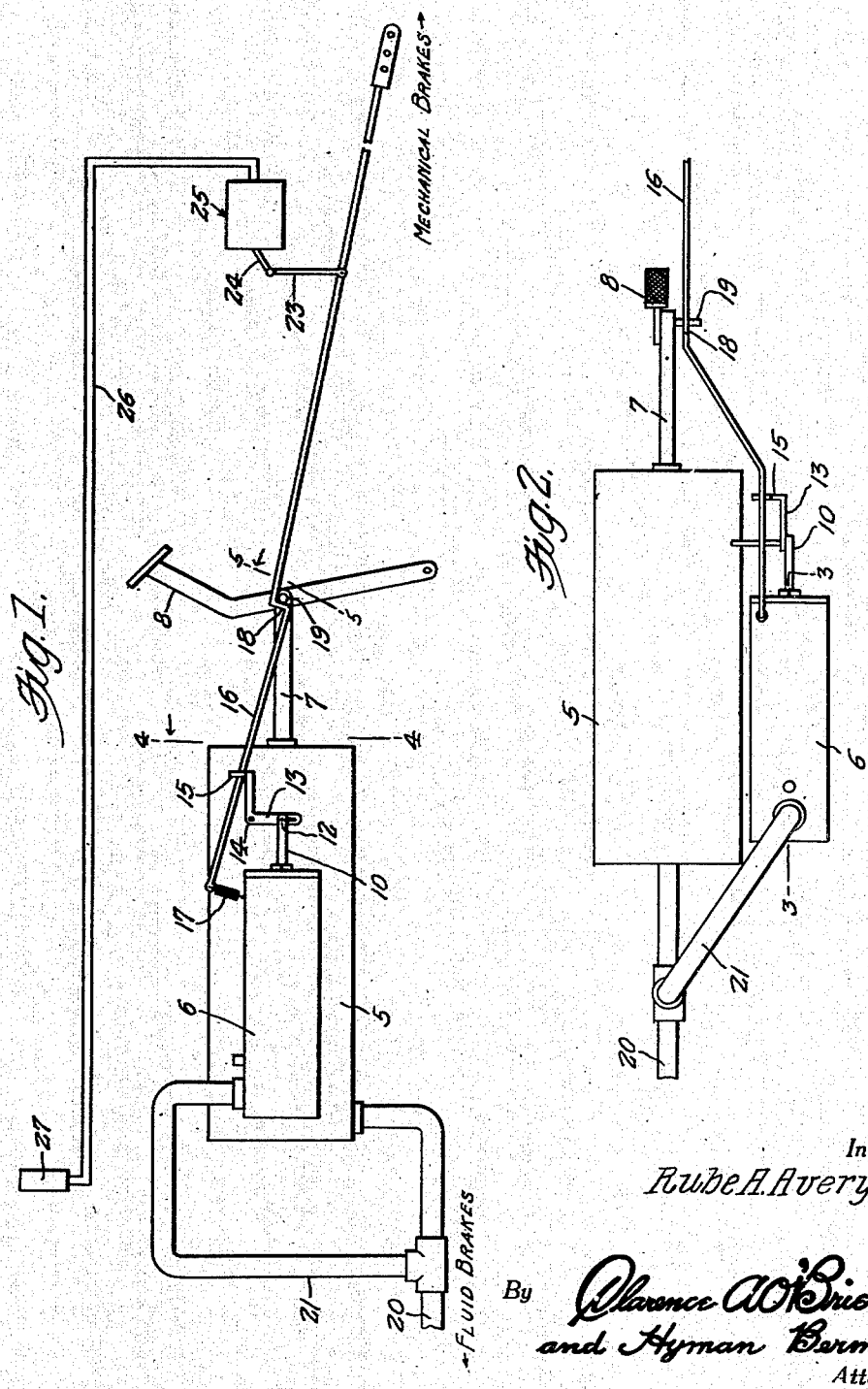

2,204,720

UNITED STATES PATENT OFFICE 2,204,720

BRAKE APPARATUS

Rube A. Avery, Hot Springs National Park, Ark.

Application March 23, 1939, Serial No. 263,794

2 Claims. (Cl. 188—106)

This invention appertains to new and useful improvements in combined fluid and mechanical brakes.

The principal object of the present invention is to provide a fool-proof structure consisting of the combination of fluid and mechanical brakes and wherein, in the event, the fluid brakes fail, the mechanical brakes will take effect immediately.

Other objects and advantages of the invention will become apparent to the reader of the following specification.

In the drawings:

Figure 1 represents a diagrammatic view showing the parts of the apparatus.

Figure 2 is a top plan view of the master and auxiliary cylinders and associated adjuncts.

Figure 3 is a section on the line 3—3 of Figure 2.

Figure 4 is a section on the line 4—4 of Figure 1.

Figure 5 is a section on the line 5—5 of Figure 1.

Figure 6 is a perspective view of the bellcrank yoke.

Referring to the drawings wherein like numerals designate like parts, it can be seen that the numeral 5 represents the master cylinder, while numeral 6 represents the auxiliary cylinder. These cylinders can be mounted on suitable supports and the master cylinder 5 is of the usual construction having the connecting rod 7 extending into the same from the brake pedal 8, for operating the usual piston means in said master cylinder 5.

As shown in Figure 3, the auxiliary cylinder 6 has the piston 9 operative therein and from the head portion thereof extends the rod 10. This rod extends through the head 11 of the cylinder and connects by way of the pin and slot connection 12 to the lower end of the bellcrank 13 which is fulcrumed as at 14.

The upper end of the bellcrank has the fork 15 which straddles the mechanical brake control rod 16. A coiled tension spring 17 has one end attached to the forward end of the rod 16 at its opposite end to the rear end of the auxiliary cylinder 6. The forward end portion of the rod 16 has an offset therein defining the shoulder 18 which is engageable with the pin 19 projecting laterally from the pedal 8 and which is normally disposed in the path of the shoulder 18 when the brakes are in inoperative position.

The fluid supply line 20 extends from the master cylinder 5 to the fluid brakes and from this line 20 extends the branch pipe 21 to the auxiliary cylinder 6. This cylinder 6 has the filler plug 22.

It can now be seen that when the pedal is depressed to operate the fluid brakes, the fluid will be under pressure in the line 20 and also in the branch pipe 21 and the piston 9 in the auxiliary cylinder 6 will be moved rearwardly so as to rock the bellcrank 13 and result in the immediate lifting of the forward portion of the rod 16 so that the shoulder 18 will not be in the path of the pin 19.

However, in the event that the fluid line fails and there is no pressure on the auxiliary piston 9 (see Figure 3), the mechanical brakes operating rod 16 will remain lowered with the shoulder 18 in the path of the pin 19, so that the pin 19 operates against the shoulder 18 and results in the operation of the mechanical brakes (not shown).

The link 23 from the rod 16 to the switch handle 24 is adapted to operate the switch generally referred to by numeral 25 when the rod is shifted to operate the mechanical brakes and this switches in the circuit 26 with the signal or indicator 27 which makes available to the driver of the vehicle a notice that his mechanical brakes are operating instead of his fluid brakes.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In combination with a fluid brake system including a master cylinder having a brakes attached fluid line extending therefrom, an auxiliary cylinder, a branch line from the brakes attached fluid line to the auxiliary cylinder, mechanical brakes, a control member for the mechanical brakes having an abutment thereon, a foot pedal for operating the master cylinder, said foot pedal having a laterally disposed projection normally in the path of the abutment, said auxiliary cylinder being provided with a piston therein, and means between the piston and the mechanical brakes controlling member whereby the latter is moved to a position with its abutment out of the path of the laterally disposed member on the foot pedal when the piston of the auxiliary cylinder is under pressure of the fluid connections to the brakes, said means between the piston and the mechanical brakes controlling member comprising a bellcrank connected at one end to the piston and being engaged at its opposite end with the mechanical brakes controlling member.

2. In combination with a fluid brake system including a master cylinder having a brake attached fluid line extending therefrom, an auxiliary cylinder, a branch line from the brake attached fluid line to the auxiliary cylinder, mechanical brakes, a controlled member for the mechanical brakes, said control member consisting of an elongated longitudinal rod having an offset at its intermediate portion defining a shoulder, a foot pedal having a laterally disposed projection normally in the path of the abutment, said auxiliary cylinder being provided with a piston therein, means between the piston and the mechanical brake controlling member whereby the latter is moved to a position with its shoulder out of the path of the projection on the foot pedal when the piston of the auxiliary cylinder is under pressure of the fluid line to the brakes, said means between the piston and the mechanical brake controlling member comprising a bell crank connected at one end to the piston and being engaged at its opposite end with the mechanical brake controlling member and a tensioned spring for holding the mechanical brake controlling member urged into position against the bell crank and to maintain the shoulder in the path of the projection.

RUBE A. AVERY.